US 7,590,944 B2

(12) United States Patent
Weber et al.

(10) Patent No.: US 7,590,944 B2
(45) Date of Patent: Sep. 15, 2009

(54) SCROLLABLE AND RE-SIZEABLE FORMULA BAR

(75) Inventors: Brandon G. Weber, Kirkland, WA (US); Charles D. Ellis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 650 days.

(21) Appl. No.: 11/096,940

(22) Filed: Mar. 31, 2005

(65) Prior Publication Data

US 2006/0224947 A1 Oct. 5, 2006

(51) Int. Cl.
G06F 3/048 (2006.01)
(52) U.S. Cl. .................................. 715/780; 715/212
(58) Field of Classification Search ................ 715/780, 715/212
See application file for complete search history.

(56) References Cited

U.S. PATENT DOCUMENTS

| | | | | |
|---|---|---|---|---|
| 5,481,668 | A * | 1/1996 | Marcus | 715/853 |
| 6,549,878 | B1 * | 4/2003 | Lowry et al. | 715/219 |
| 6,990,480 | B1 * | 1/2006 | Burt | 707/1 |
| 7,080,325 | B2 * | 7/2006 | Treibach-Heck et al. | 715/780 |
| 7,315,880 | B2 * | 1/2008 | Chang et al. | 709/203 |
| 2003/0051209 | A1 * | 3/2003 | Androski et al. | 715/503 |
| 2004/0210822 | A1 * | 10/2004 | Kotler et al. | 715/500 |

OTHER PUBLICATIONS

IBMTDB: NA9404635. Title: Sizeable Scroll Bar Box for Text Display Publication-Data: IBM Technical Disclosure Bulletin, Apr. 1994, U.S. vol. 37, Issue 4A, p. 635-636 Publication-Date: Apr. 1, 1994.*
EP Search Report and Search Opinion, dated Feb. 24, 2009, issued in Application No. 06111605.9—1527/1708093.
Partial EP Search Report, dated Dec. 9, 2008, issued in Application No. 06111605.9—1527/1708093.

* cited by examiner

Primary Examiner—Sara M Hanne
(74) Attorney, Agent, or Firm—Merchant & Gould PC

(57) ABSTRACT

The present invention relates to new and improved embodiments of systems and methods for displaying content within a spreadsheet graphical user interface. In one embodiment, a computer system has a graphical user interface that performs a method for displaying data within a spreadsheet application. The method comprises displaying a formula bar comprising a text box that displays data contained in the spreadsheet, displaying a first portion of the spreadsheet data in the text box, and expanding the formula bar to display a second portion of the spreadsheet data in the text box.

20 Claims, 10 Drawing Sheets

SCROLLABLE AND RE-SIZEABLE FORMULA BAR

TECHNICAL FIELD

The present invention relates generally to the field of user interface displays. More particularly, the invention relates to the display of data and formulas created within spreadsheets.

BACKGROUND OF THE INVENTION

Various applications accept, manipulate, and display content on a graphical user interface, such as Microsoft® Windows® operating system. One application that displays data in various formats on a graphical user interface is a spreadsheet application, such as the Microsoft® Excel spreadsheet application. Spreadsheet software or applications are relatively well-known and useful tools. Typical spreadsheet applications simulate physical spreadsheets by capturing, displaying, and manipulating data arranged in rows and columns. The intersecting rows and columns create numerous cells within the spreadsheet. Typically, each cell may contain an item of data and/or a mathematical formula.

Generally, spreadsheets include a formula bar. A formula bar is a user interface item that allows the user to enter data into the formula bar to enter that data into a cell or allows the user to read data that is contained in a selected cell. The formula bar accepts text, numbers, formulas, and other various types of data. Generally, the formula bar has a text box, which generally displays a single line of data. Inside the text box, the contents of an active cell are displayed. The active cell is typically the cell that is currently selected and has the focus of the spreadsheet. Unfortunately, the active cell often contains more data than can be shown in the single line text box.

To allow the user to display more of the data within the text box, the text box allows the user to place the cursor inside the data and then move the cursor to view the rest of the data. However, the text box still only displays a single line of text. Thus, the user cannot see the entire set of data or even a large portion of the data within the text box. When editing formulas or other larger collections of text, the limitations of the single line text box become evident. The user must continually scroll back and forth in the text box to ensure the formula or text is entered correctly because the user cannot see the formula in its entirety within the text box.

Some other formula bars provide a display where only the text box expands to shown the data in the active cell. Unfortunately, if there is a large amount of data, the text box often covers other menu bars, toolbars, or cells within the spreadsheet. The expanded text box obscures the user's view of the data within the spreadsheet. To view the cells of data covered by the expanded text box, the user often must select a different cell or scroll the spreadsheet to move the covered data out from under the expand text box. The expanding text box prevents the continuous display of the data and frustrates users by requiring their interaction with the spreadsheet to adjust the view continually. It is with respect to these and other considerations that the present invention was made.

SUMMARY OF THE INVENTION

The present invention relates to new and improved embodiments of systems and methods for displaying content within a spreadsheet graphical user interface. In one embodiment, a computer system has a graphical user interface that performs a method for displaying data within a spreadsheet application. The method comprises displaying a formula bar comprising a text box that displays data contained in a cell, displaying a first portion of the cell data in the text box, and expanding the formula bar to display a second portion of the cell data in the text box.

In another embodiment, a graphical user interface performs a method comprising receiving focus on an active cell in the spreadsheet, expanding a formula bar such that the formula bar would prevent the active cell from being displayed in the spreadsheet, and automatically scrolling the display of the spreadsheet to continue to display the active cell.

Another embodiment of the present invention comprises a method performed by a graphical user interface. The method comprises receiving an input to display data in a cell, wherein the data is shown in a text box in a formula bar, determining that only a first portion of the cell data can be shown in the text box, and in response to the determination and, without expanding the formula bar, providing a visual indication that there is more data than is currently shown in the text box.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of presently exemplary embodiments of the invention, and to the appended claims.

DETAILED DESCRIPTION OF THE INVENTION

The present invention will now be described more fully hereinafter with reference to the accompanying drawings, in which embodiments of the invention are shown. The invention may, however, be embodied in many different forms and should not be construed as limited to the embodiments set forth herein. Rather, these embodiments are provided so that the disclosure will be thorough and complete and will fully convey the scope of the invention to those skilled in the art.

The present invention relates to new and improved embodiments of systems and methods for displaying spreadsheet data within a formula bar. In embodiments of the present invention, data is input or contained within one or more cells. Upon selecting a cell with data or inputting data into a cell, the data is also shown in a text box within a formula bar. The text box in the formula bar provides the user with a user interface device to add, delete, or edit the data within a selected cell. The text box provides a limited amount of display space to view the data, such as single line of data. If the data contained in the cell cannot be displayed in the available space within the text box, the formula bar can be expanded to increase the display space of the text box. With the formula bar and text box expanded, the user views, in the text box, more or all of the data contained in the cell.

Figure 1:
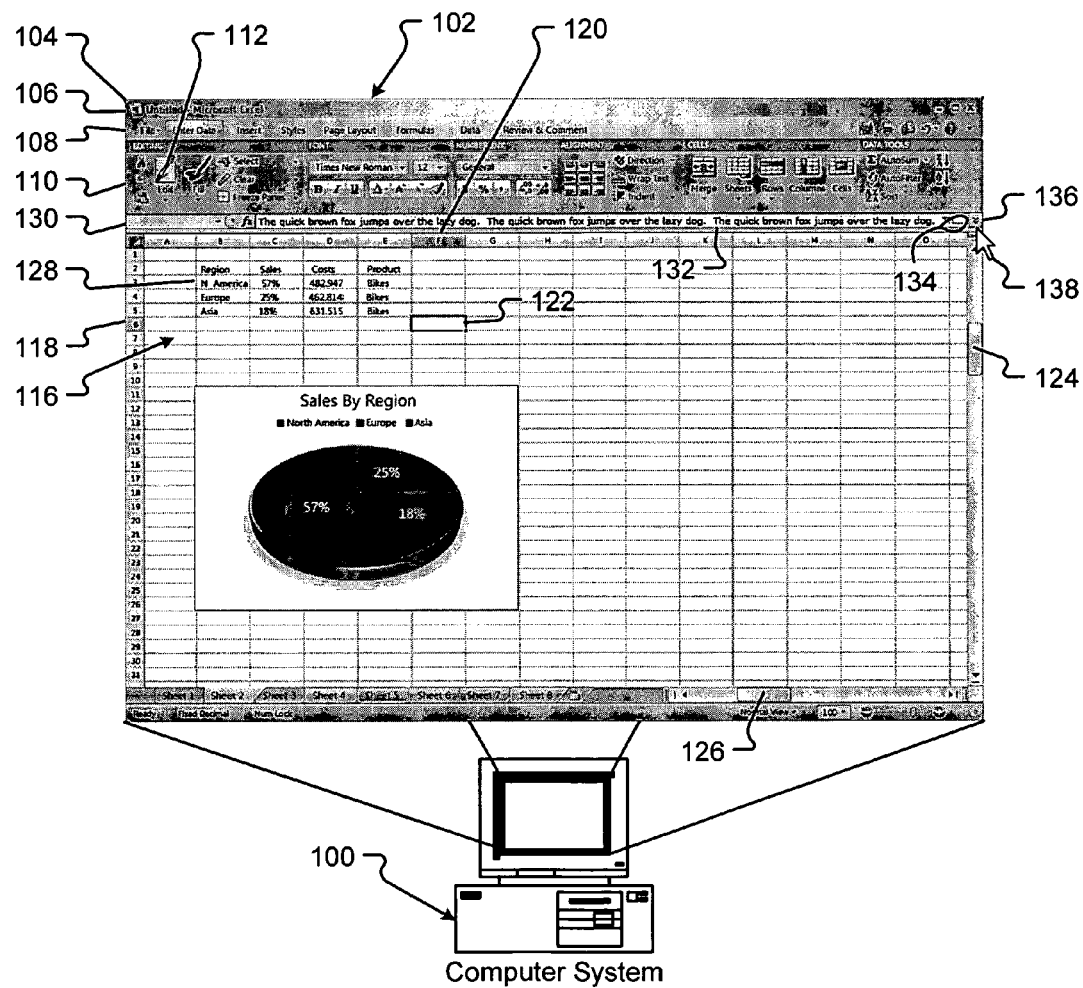
FIG. 1 is an exemplary embodiment of a display of a spreadsheet having an expandable formula bar according to the present invention.

A computer system 100 that used to create a spreadsheet having an expandable formula bar in accordance with the present invention is shown in FIG. 1. As used herein, a "computer system" shall be construed broadly and is defined as, "one or more devices or machines that execute programs for displaying and manipulating text, graphics, symbols, audio, video, and/or numbers." The computer system 100 displays information, such as display screen 102. The display screen 102 is enlarged to show details of the display. The display 102 relates to an embodiment of a display of an example spreadsheet application with an expandable formula bar. In this particular example, the display 102 has a spreadsheet window 104 with a title bar 106. Further embodiments of the spreadsheet window 104 have a menu bar 108 and a tool bar 110. The tool bar 110 provides user controls, such as an edit control 112, among potentially many others. Such user interface controls are generally known in the art and are useful in managing certain types of information.

Within the spreadsheet window 104, there is a spreadsheet 116. The spreadsheet 116 is formed by intersecting rows, such as row 6 118, and columns, such as column F 120. The intersecting rows and columns form cells, such as cell F6 122, which are identified by the cell's corresponding column and row, e.g., cell "F6" 122 is in column F 120 and row 6 118. The spreadsheet 116, shown in FIG. 1, displays 15 columns and 31 rows. However, the spreadsheet 116 may include many more rows and columns as represented by the scroll bars 124 and 126.

A cell is both a display and a container within the spreadsheet. As such, each cell can display an item and contain the item. For example, cell B3 128 in FIG. 1 displays the item "N America," which is a text entry. In embodiments, the items in the cells are derived from various user input into the spreadsheet, such as the user manual typing the item into a cell or the user copying and pasting the value into the cell. In one embodiment, the user enters the data into the cell by inputting the data into a formula bar, such as formula bar 130. The formula bar 130 comprises a text box 132 that displays the data for an active cell, such as cell 122. In some embodiments, such as in FIG. 1, the text box 132 displays data entered into the text box 132 before it is entered into the active cell 122. This situation occurs when the users inputs the data into the text box 132 but has yet to submit the data to be input into the cell. Thus, data is shown in the text box 122 but not in the active cell 122. In other embodiments, the data contained in cell 122 is displayed in both the cell 122 and the text box 132.

In embodiments of the present invention, the formula bar 130 is expandable. The text box 132 displays a first portion of data. The text box 132 in the formula bar 130 in FIG. 1 displays only a single line of data. However, the text box 132 contains more data than is displayed. The spreadsheet application 104 displays one or more visual indications that the text box 132 contains more data than can be displayed in the text box's current configuration. For example, ellipses 134 are shown at the end of the data currently displayed in the text box 132. In another embodiment, the spreadsheet application 104 provides a user control, such as button 136, that expands the formula bar 130 if the user selects the control 136 with a cursor, such as cursor 138. The expandable formula bar is explained in more detail hereinafter.

Figure 2:
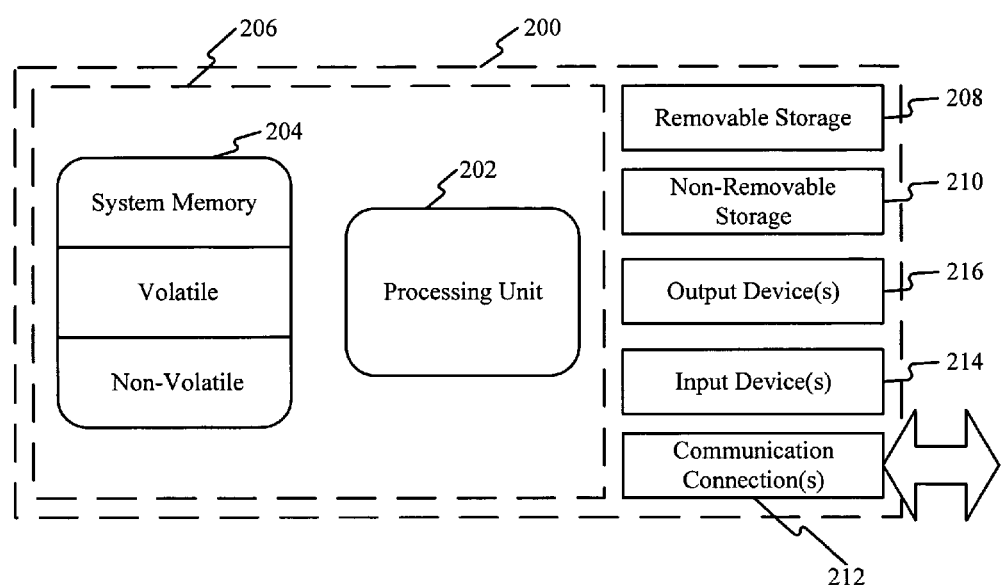
FIG. 2 is a functional diagram illustrating a computer environment and computing device operable to provide a task helper according to the present invention.

An embodiment of a suitable operating environment in which the present invention may be implemented is shown in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary computing environment for implementing the embodiments of the present invention includes a computing device, such as computing device 200. In its most basic configuration, computing device 200 typically includes at least one processing unit 202 and memory 204. Depending on the exact configuration and type of computing device 200, memory 204 may be volatile (such as RAM), non-volatile (such as ROM, flash memory, etc.), or some combination of the two. This most basic configuration of the computing device 200 is illustrated in FIG. 2 by dashed line 206.

Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Such computer storage media includes volatile and nonvolatile, removable and non-removable media implemented in any method or technology for storage of information such as computer readable instructions, data structures, program modules, or other data. Memory 204, removable storage 208, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which can be used to store the desired information and which can be accessed by device 200 and processor 202. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216, such as a display, speakers, printer, etc., may also be included. These devices, either individually or in combination can form the user interface used to display the spreadsheet application with the expandable formula bar as described herein. All these devices are well know in the art and need not be discussed at length here.

Computing device 200 typically includes at least some form of computer readable media, which can be some form of computer program product. Computer readable media can be any available media that can be accessed by processing unit 202. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

Figure 3:
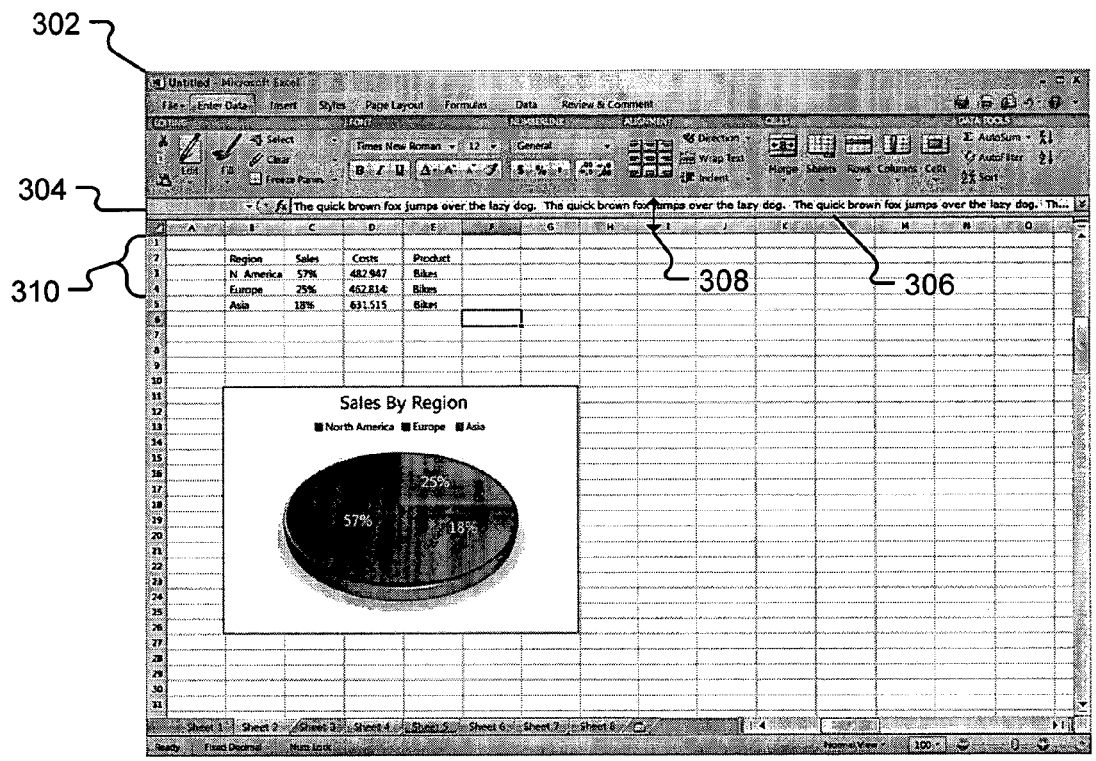
FIG. 3 is another exemplary embodiment of a spreadsheet application having an expandable formula bar according to the present invention.

Another embodiment of a spreadsheet application 302 having an expandable formula bar 304 is shown in FIG. 3. The formula bar 304 shown in FIG. 3 also comprises a text box 306. In the configuration shown in FIG. 3, the formula bar 304 has yet to be expanded. In embodiments, the spreadsheet application 302 receives input to expand the formula bar 304. For example, the user may select a control button, such as button 136 in FIG. 1. In another example, the user places a cursor, such as cursor 308, over a portion of the formula bar 304 to resize the formula bar 304. In other embodiments, the expandable formula bar 304 expands automatically to show more data in the text box 306.

Figure 4:
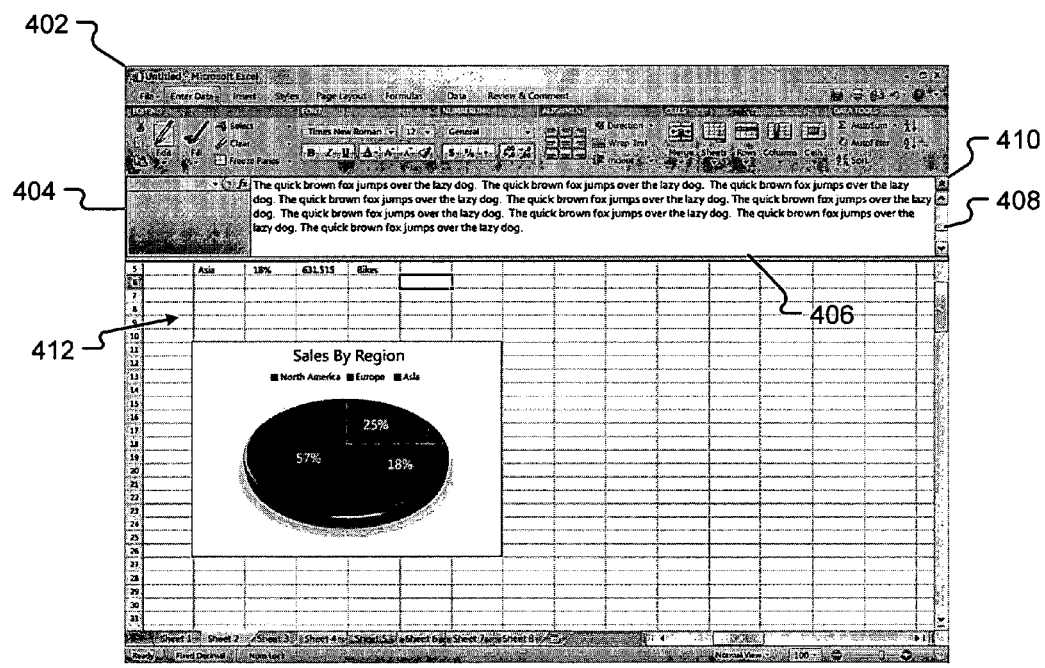
FIG. 4 is another exemplary embodiment of a display of a spreadsheet application having an expandable formula bar according to the present invention.

An embodiment of a spreadsheet application 402 with an expanded formula bar 404 is shown in FIG. 4. In this example, the formula bar 404 is expanded to display a larger text box 406, which displays all of the data currently contained in the text box 406. In embodiments of the present invention, the formula bar 404 expands to a maximum size, such as enlarging to view five lines of text in the text box 406. In other embodiments, the formula bar 404 expands in one or more discrete steps, such as enough to display another line of text in the text box 406. A user can control the amount of expansion.

In other embodiments, the enlarged formula bar 404 comprises a text box 406 that displays another portion of the data but cannot display all of the data. For example, the data within the text box 406 may be too voluminous to display even in an expanded text box 406. In this example, the spreadsheet application 402 can provide a user interface, such as scroll bar 408, to scroll through the data in the text box 408. In addition, the spreadsheet application 402, in some embodiments, provides another user control, such as control button 410, to un-expand, shrink, or minimize the expanded formula bar 402.

The spreadsheet application 402 in FIG. 4 shows one embodiment of the expanded formula bar 404 that expands to cover a portion of the spreadsheet 412. For example, if the spreadsheet application 302 in FIG. 3 and spreadsheet 402 in FIG. 4 show the same spreadsheet before the formula bar (302) is expanded and after the formula bar (402) is expanded, it can be seen that a portion of the spreadsheet in FIG. 4 has been covered by the formula bar 402. Particularly, the set of rows 310 in FIG. 3 are now covered by the expanded formula bar 404 in FIG. 4.

Figure 5:
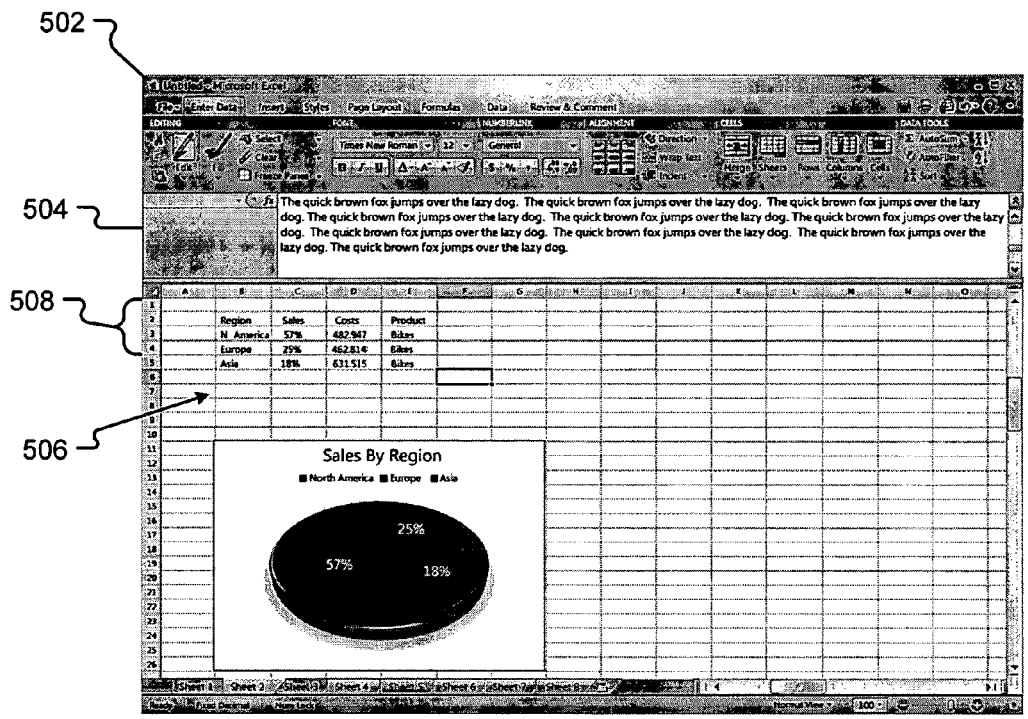
FIG. 5 is another exemplary embodiment of a display of a spreadsheet application having an expandable formula bar according to the present invention.

In another embodiment, a spreadsheet application 502, shown in FIG. 5, also provides an expanded formula bar 504. However, in this embodiment, the formula bar 504 does not cover parts of the spreadsheet 506 after expansion. For example, the set of rows 508 in FIG. 5 correspond to the same set of rows 310 in FIG. 3. Thus, although the formula bar 504 was expanded, the spreadsheet display compensates for the increased size of the expanded formula bar 504 and automatically adjusts the spreadsheet 506 to continue to display the set of rows 508.

In one embodiment, the spreadsheet application 502 determines the location of the top of the spreadsheet 506 displayed before the expansion of the formula bar. Then, after the expansion of the formula bar, the spreadsheet application 502 determines where the top of the spreadsheet currently exists. For example, if the spreadsheet application 402 in FIG. 4 is an intermediate stage of the expansion process, the top of the spreadsheet 412 is four rows above the bottom of the expanded formula bar 406. The spreadsheet application 502 then determines how far to scroll the spreadsheet to continue to display the top of the spreadsheet 506. For example, if the spreadsheet is four rows above the bottom of the expanded formula bar, as in FIG. 4, the spreadsheet application 502 needs to scroll the spreadsheet four rows. The spreadsheet application 502 then automatically scrolls the spreadsheet 506 to display the top set of rows 508 in the spreadsheet 506.

In other embodiments, the spreadsheet application 502 determines which cell is the active cell, such as cell 122 in FIG. 1. Then, the spreadsheet application 502 determines if the active cell is still displayed in the spreadsheet after expanding the formula bar 504. If the spreadsheet does not display the active cell after the formula bar is expanded, then the spreadsheet application 502 automatically scrolls the spreadsheet until the active cell is displayed again. Thus, the spreadsheet application 502 can adjust the spreadsheet display to compensate for the expansion of the formula bar 504. One skilled in the art will recognize other adjustments to the spreadsheet that may be made to compensate for or adjust to the expansion of the formula bar. The automatic scrolling of the spreadsheet is described further hereinafter.

Figure 6:
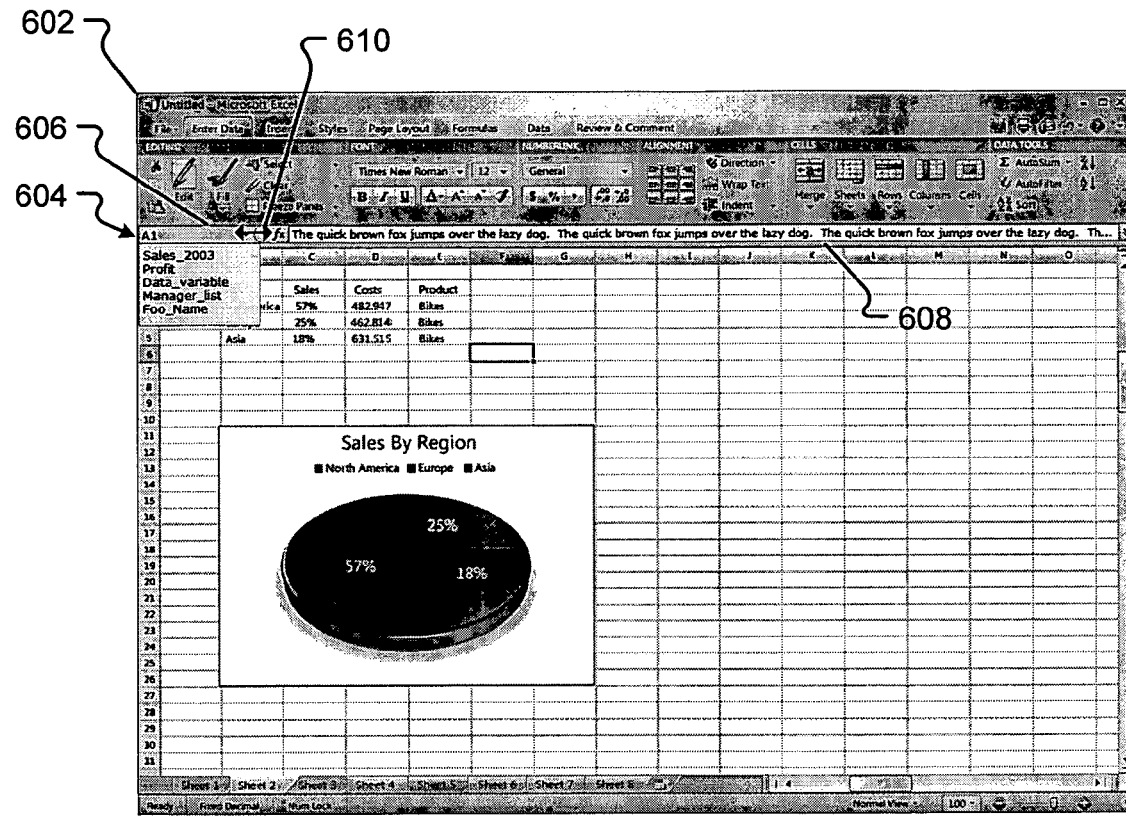
FIG. 6 is another exemplary embodiment of a display of a spreadsheet application having an expandable formula bar according to the present invention.

Another embodiment of a spreadsheet application 602 with an expandable formula bar 604 is shown in FIG. 6. In embodiments of the present invention, the expandable formula bar 604 also comprises a list box 606 for listing the cells that can be selected to view the selected cell's data within the text box 608. The list box 606 is a user interface and user control that allows a user to select a cell from the list to display the contents of that cell in the text box 608. In some embodiments, the cells have identifiers derived from the cells row and column, such as the "A1" selection shown in FIG. 6. In other embodiments, the cells have names or metadata assigned to the cells, such as "Sales_2003" shown in FIG. 6, that are displayed in the list box 606.

In embodiments of the present invention, the expandable formula bar 4604 is also resizable. For example, a user uses a mouse cursor, such as cursor 610, to select a division between the list box 606 and the text box 608. Upon selecting the division, the user can resize the list box 606 and the text box 608. Essentially, the user can make the text box 608 larger or smaller by dragging and dropping the division. Resizing the text box 608 allows the user to view more or less data in the text box 608. In some embodiments, the user can resize the text box 608 such that the data in the text box 608 is seen without needing to expand the formula bar 604. However, the opposite situation is also possible, in that the user may contract the text box 608 so that the user must expand the formula bar 604 to view the data in the text box 608.

Figure 7:
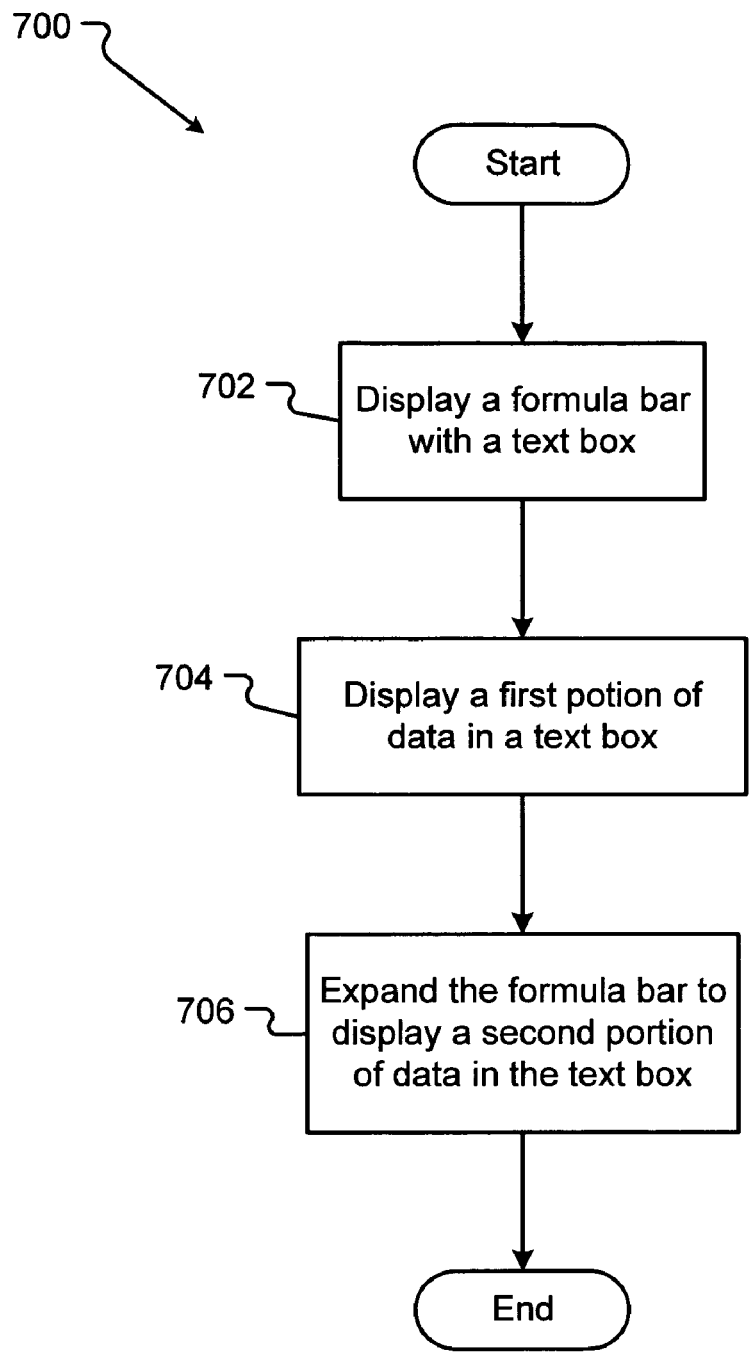
FIG. 7 is a flow diagram representing an embodiment of the present invention for expanding a formula bar to display a second portion of data within a text box in the formula bar.

An exemplary embodiment of a method 700 for expanding the formula bar is shown in FIG. 7. Here, display operation 702 displays a formula bar, such as formula bar 130, that comprises a text box, such as text box 132. Display operation 704 displays a first portion of data in the text box, such as the portion of data shown in text box 132 in FIG. 1.

Expand operation 706 expands the formula bar to display a second portion of data in the text box, such as the greater portion of data shown in text box 506 in FIG. 5. In one embodiment, the formula bar automatically expands when the focus is placed on a cell with more data than can be displayed in the text box. In another embodiment, the user types data into the text box, and the text box automatically expands as the user enters more data into the text box than the text box can display.

Other embodiments of the present invention expand the formula bar upon some user interface input. For example, the user uses the mouse to "double click" on a portion of the user interface. In this example, the user places the mouse cursor, such has cursor 138, over a portion of the formula bar. Upon double clicking the mouse button, the formula bar expands. In another embodiment, the user selects, by clicking a single time with the mouse, a control, such as control 136, to expand the formula bar. In still another embodiment, the user hovers over, by maintaining the mouse cursor over a portion of the formula bar for a period of time, or selects a portion of the formula bar to change the mouse cursor to an expand cursor, such as cursor 308. Then, the user "grabs" the formula bar and "drags" the formula bar until it is expanded. In still another embodiment, the user selects a selection from a menu to expand the size of the formula bar. In still another embodiment, the user "right clicks" on a mouse to display a pop-up menu. The pop-up menu has a selection to expand the formula bar. A keyboard command, in other embodiments, could direct the expansion of the formula bar. One skilled in the art will recognize other user interface methods and inputs that can affect the expansion of the formula bar.

In one embodiment, the formula bar expands enough to display all the data in the text box. In other embodiments, the formula bar expands to some pre-selected or predetermined maximum width. In some embodiments where the data in the expanded text box still does not display all of the data contained in the text box, the text box renders a scroll bar, such as scroll bar 408. The user can select the scroll bar to scroll through the data in the text box. In further embodiments, the user may resize the text box and a list box, such as list box 606 by selecting a division in the formula bar with a cursor. The cursor changes to a resize cursor, such as cursor 610, and the user drags the division to change the size of the text box.

Figure 8:
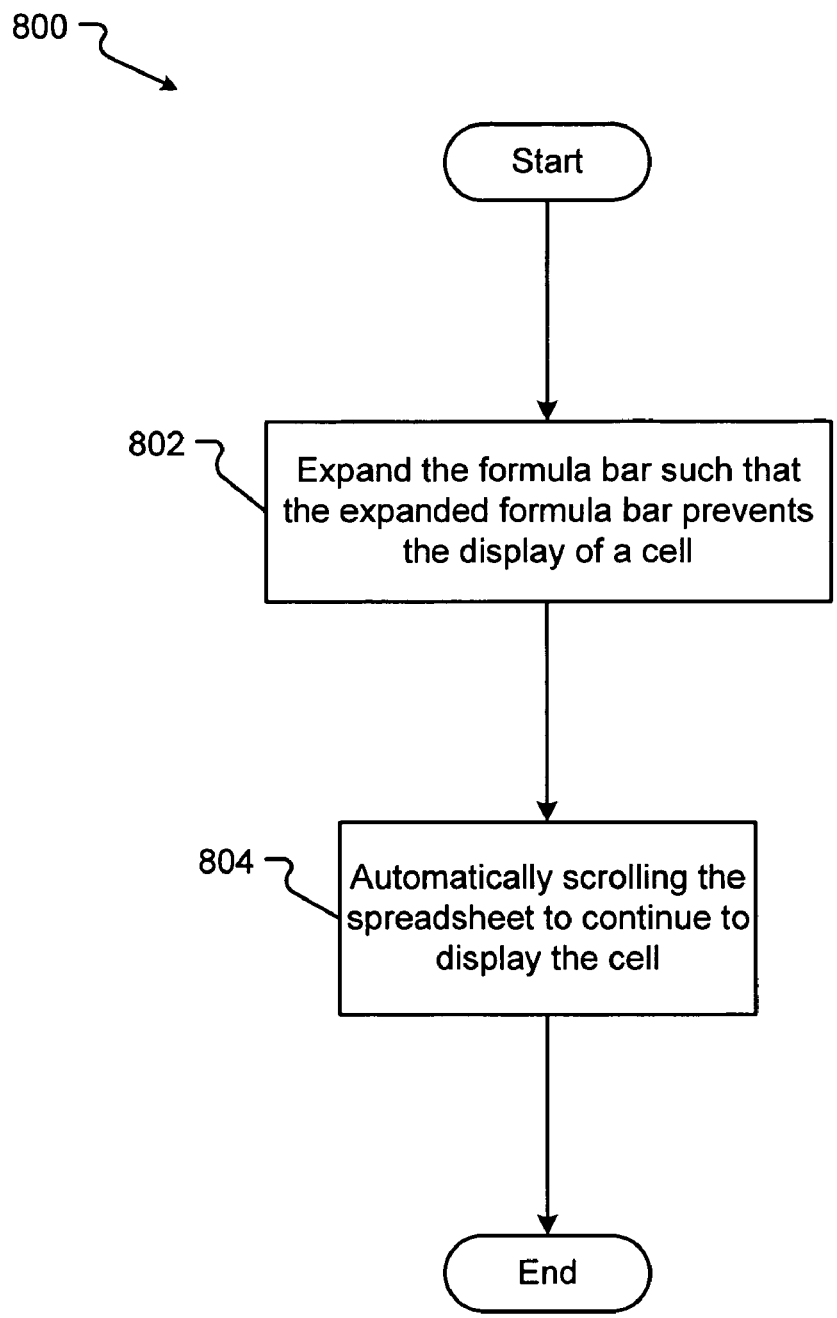
FIG. 8 is a flow diagram representing an embodiment of the present invention for automatically scrolling the display of the spreadsheet to continue to display an active cell after the expansion of the formula bar.

An exemplary embodiment of a method 800 for automatically scrolling a spreadsheet in response to the expansion of a formula bar is shown in FIG. 8. Expand operation 802 expands the formula bar, such as formula bar 404 in FIG. 4.

The formula bar prevents the display of at least one cell in the spreadsheet. For example, formula bar 404 prevents the display of the set of rows 310 shown in FIG. 3 because formula bar 404 is displayed over or instead of the set of rows.

Then, scroll operation 804 automatically scrolls the spreadsheet in the display to continue to display the cell or cells. Scrolling is any action that changes the display of the spreadsheet, such as by moving rows of data down or up in a display to display a different portion of the spreadsheet. For example, the spreadsheet 502 is moved within the display to continue to display the set of rows 508 in FIG. 5, which correspond to the set of rows 310 in FIG. 3. In embodiments of the present invention, the spreadsheet scrolls to display an active cell. In other embodiments, the spreadsheet scrolls to display a topmost or bottommost row or one or more cells that contain data. One skilled in the art will recognize other portions of the spreadsheet that the spreadsheet application may scroll to continue to display.

Figure 9:
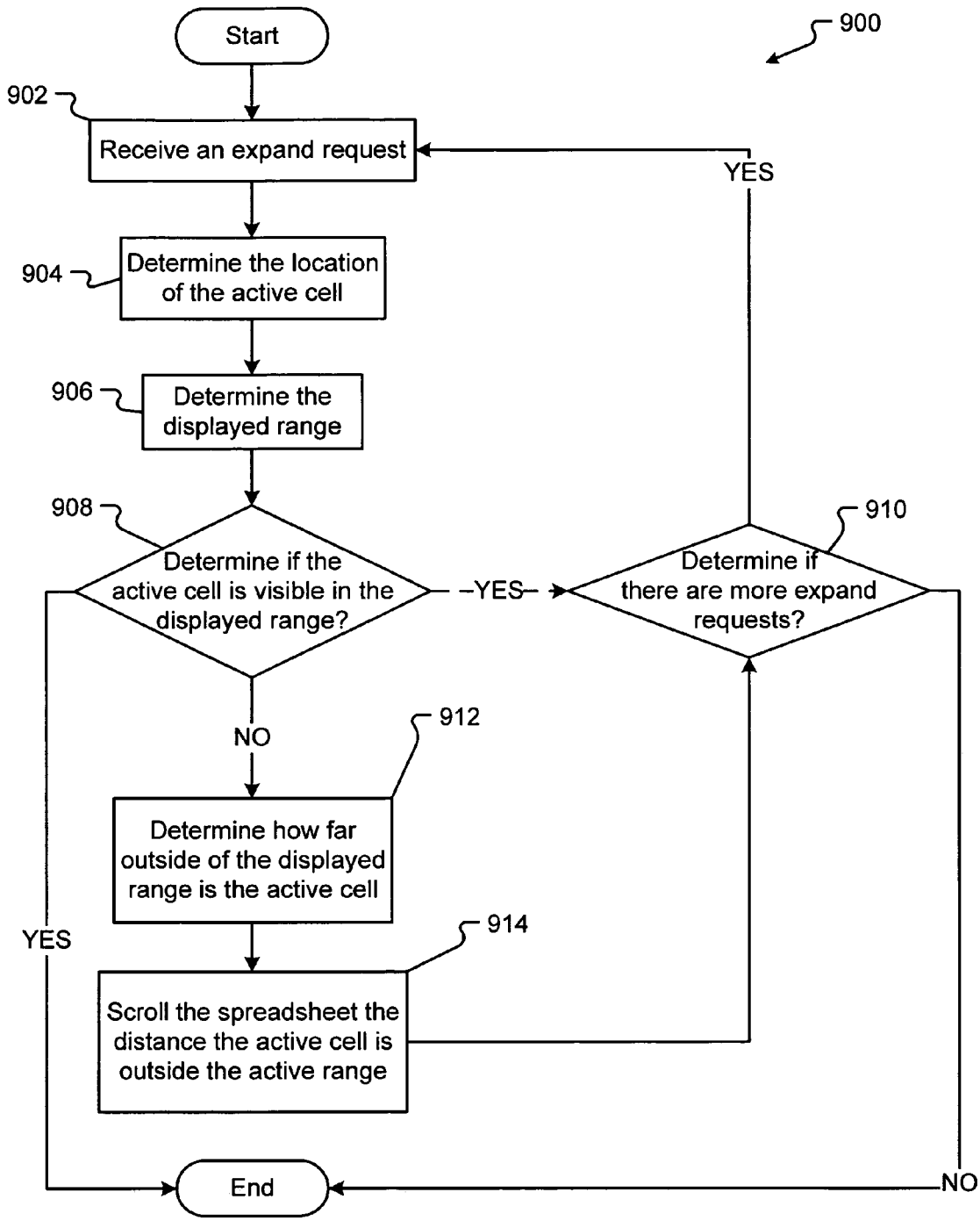
FIG. 9 is another flow diagram representing an embodiment of the present invention for automatically scrolling the display of the spreadsheet to continue to display an active cell after the expansion of the formula bar.

A further embodiment of a method 900 for automatically scrolling a spreadsheet is shown in FIG. 9. First, receive operation 902 receives an expand request. The expand request can be an event that executes an expansion automatically or an input from a user interface device to expand the formula bar, such as formula bar 304. Then, determine operation 904 determines the location of the active cell, such as cell 122 in FIG. 1. In embodiments of the present invention, the spreadsheet application determines the cell identifier, such as "A7," for the active cell. Determine operation 906 determines the range of the displayed cells after a formula bar expansion. In one embodiment, the spreadsheet application determines the identifier for the topmost row and the bottommost row in the displayed range.

Then, determine operation 908 determines if the active cell is in the displayed range. In embodiments, the cell identifier for the active cell is compared to the identifiers for the top and bottom rows. If the cell identifier is in a row above the topmost row or below the bottommost row in the displayed range, then the spreadsheet application recognize that the active cell is outside the displayed range. For example, if the active cell is cell A1, which means the cell is in row 1, and the topmost row in the displayed range is row 5, then the active cell is outside the displayed range. If the active cell is in the displayed range, the flow branches YES to end the method 900.

In some embodiments, a series of expand requests are issued. For example, if the user drags the bottom of the formula bar, such as formula bar 304, with a cursor, such as cursor 308, each line of the display that the formula bar moves can be a single expand request. As such, if the user expands the formula bar over two or more lines of text, the auto scroll operation 900 continuously adjusts the display to display the active cell. Thus, in some embodiments, the flow optionally branches YES to determine operation 910. Determine operation 910 determines if there is another expand request. In one embodiment, the user dragging the formula bar over more than one line of text signifies that more expansion requests may be received. If there are more expansion requests, the flow branches YES to receive operation 902. If there are no more expansion requests, the flow branches NO to end the method.

If the active cell is not in the displayed range, flow branches NO from determine operation 908 to determine operation 912. Determine operation 912 determines how far outside the displayed range is the active cell. In one embodiment, the spreadsheet application compares the cell identifier to the topmost or bottommost row in the displayed range. The comparison provides a number of rows outside the displayed range that the active cell is set. For example, active cell A1 compared to topmost row 5 is four rows from the displayed range. The comparison can be a simple mathematical operation, such as:

Rows_outside_displayed_range=
((row#_topmost_row)−(row#_active_cell))

Scroll operation 914 automatically scrolls the spreadsheet. In embodiments of the present invention, the scroll operation 914 receives the number of rows calculated by the determine operation 912 and scrolls the spreadsheet that number of rows. In further embodiments of the present invention, the spreadsheet application also moves any task panes or other menu bars or formula bars that may be covered by the expanding formula bar. Thus, any user interface item that may be covered by the expansion of the formula bar is "pushed down" in the user interface to maintain the display of those items.

Figure 10:
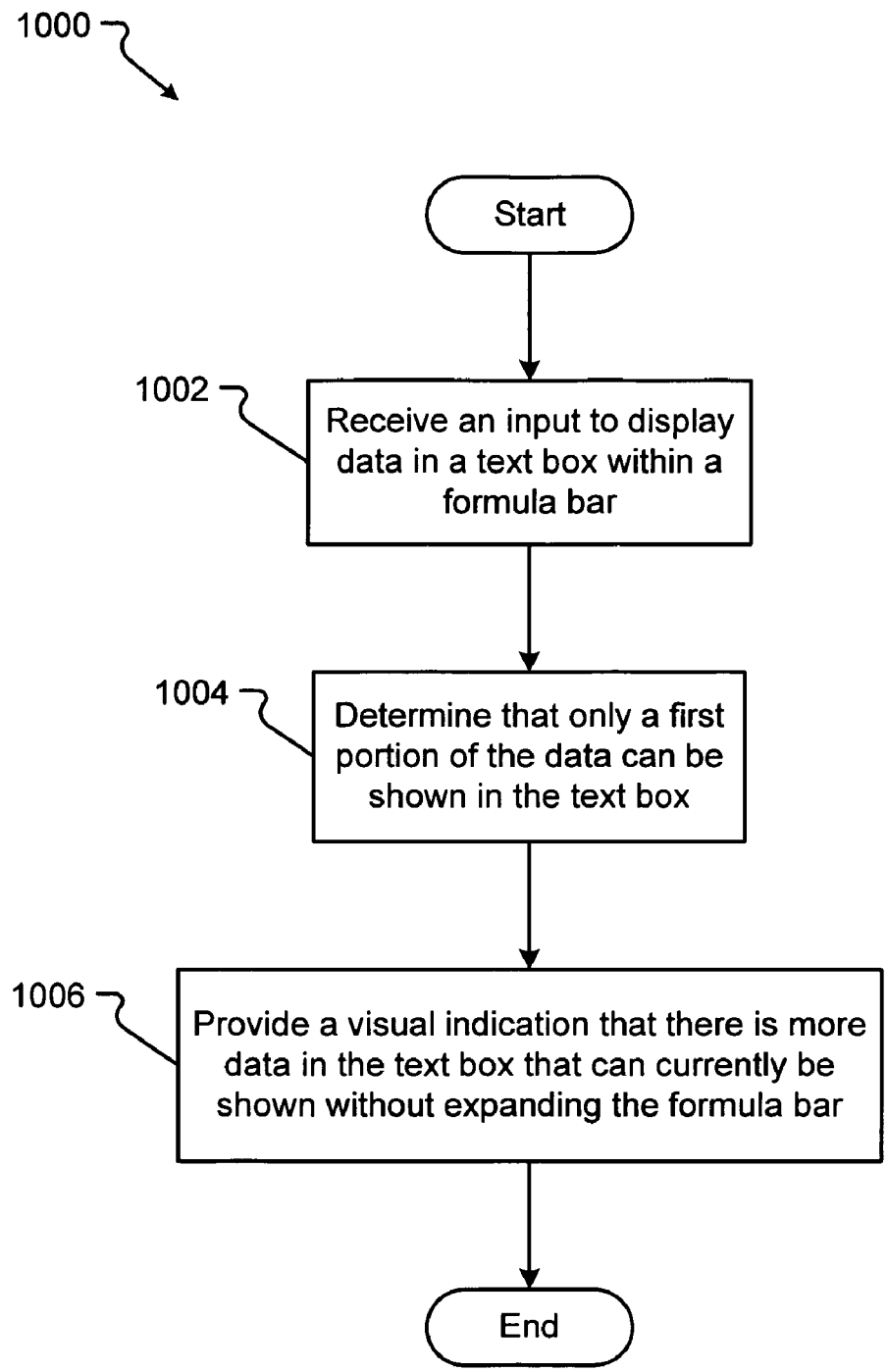
FIG. 10 is a flow diagram representing an embodiment of the present invention for providing a visual indication that a text box contains more data than can be displayed without expanding the formula bar.

An exemplary method 1000 for providing a visual indication that the text box contains more data than is displayed is shown in FIG. 10. Receive operation 1002 receives an input to display data in the text box, such as text box 132, in a formula bar, such as formula bar 130. In one embodiment, the user types data into the text box. In another embodiment, the user selects a cell containing data, and the spreadsheet application changes the focus to the selected cell.

Determine operation 1004 determines that only a first portion of the data can be shown in the text box. In one embodiment, the spreadsheet application determines the number of characters available to be displayed in the text box and determines the number of characters in the data. If the data has more characters than can be displayed, the spreadsheet application determines that only a portion of the data can be shown. In another embodiment, the user resizes the text box with a cursor, such as cursor 610, and changes the size of the text box display. Upon shrinking the text box, determine operation 1004 determines if the text box can only show a portion of the data within the resized text box.

Then, provide operation 1006 provides a visual indication that there is more data contained in the text box than can be displayed. In one embodiment, the spreadsheet application renders ellipses, such as ellipses 134, at the end of the displayed data in the text box. In another embodiment, the spreadsheet application provides a user control, such as control 136, that signifies the formula bar may be expanded to display more data in the text box. Regardless, the formula bar does not expand to display the data.

In embodiments of the present invention, changes to user interface software objects of the spreadsheet application affect the expandable formula bar. In one embodiment, a property is added to a formula bar software object. The property is referred to as ExpandedStateValue hereinafter. ExpandedStateValue provides whether the formula is in an expanded state or an unexpanded state. Further, ExpandedStateValue contains a value for the number of lines displayed in the expanded state. In one embodiment, the number of lines displayed has a default value, such as three lines of text. In other embodiments, the user sets the value by input into the user interface. For example, the user may drag the formula bar to display five lines of text. Upon dropping the formula bar, the property for the maximum lines displayed is set to five in the ExpandedStateValue. This value for number of lines to display may persist. In other words, the user-set value remains the maximum number of lines displayed until the user changes the value.

In expanding the formula bar, the user interface receives input and changes the formula bar either to its expanded or unexpanded state in response to the input. For example, if the user selects a "one-click" expansion button, the spreadsheet application sets the ExpandedStateValue to the expanded state and reads the value of the maximum number of lines to display. The spreadsheet application re-renders the formula bar display object such that the formula bar is expanded to display the maximum number of lines read from the ExpandedStateValue setting. Similarly, if the spreadsheet application receives user input to collapse the formula bar, such as the selection of a "one-click" collapse button, the ExpandedStateValue is returned to the collapsed state. The formula bar is re-rendered to display only a single line of text.

Although the present invention has been described in language specific to structural features, methodological acts, and computer readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. In a computer system having a graphical user interface including a display device and one or more user interface selection devices, a method for displaying data within a spreadsheet application, the method comprising:
    displaying, on the display device, a formula bar comprising a text box that displays spreadsheet data;
    displaying, on the display device, a first portion of the spreadsheet data in the text box;
    in response to a first user interface input, expanding the formula bar to display a second portion of the spreadsheet data in the text box, wherein expanding the formula bar comprises:
        determining a location of the top of the spreadsheet in relation to the expanded formula bar; and
        automatically adjusting the location of the top of the spreadsheet based on the determined location; and
    in response to a second user interface input, collapsing the formula bar to display only a single line of the data in the text box.

2. The method of claim 1, wherein the first user interface input is a selection of a user control.

3. The method of claim 1, wherein the first user interface input is a double click of a mouse in a portion of the formula bar.

4. The method of claim 1, wherein the first user interface input is a drag and drop of the formula bar.

5. The method of claim 1, wherein the text box contains a third portion of data and expanding the formula bar further comprises providing a user interface device to scroll to the third portion of data in the text box.

6. The method of claim 1, wherein the text box contains a third portion of data and expanding the formula bar further comprises providing a visual indication that the text box contains the third portion of data.

7. The method of claim 1, furthering comprising displaying a list box in the formula bar, wherein a user selects, from the list box, a cell identifier for a cell to display in the text box the cell data contained within the selected cell.

8. The method of claim 1, wherein expanding comprises:
    receiving user input into the text box; and
    automatically expanding the formula bar when the user input contains more data than can be displayed in the text box.

9. The method of claim 1, further comprising:
providing a formula bar division;
receiving a second input on the formula bar division; and
in response to the second input, resizing the text box in the formula bar.

10. The method of claim 1, wherein user input includes receiving a user interface input to collapse the formula bar.

11. In a computer system having a graphical user interface including a display device and one or more user interface selection devices, a method for displaying data within a spreadsheet of a spreadsheet application, the method comprising:
displaying, on the display device, a formula bar comprising a text box that displays spreadsheet data;
displaying, on the display device, a first portion of the spreadsheet data in the text box;
in response to user input, expanding the formula bar to display a second portion of the spreadsheet data in the text box;
determining a location of the top of the spreadsheet in relation to the expanded formula bar;
automatically adjusting the location of the top of the spreadsheet based on the determined location; and
displaying the expanded formula bar and the spreadsheet on the display device.

12. The method of claim 11, further comprising in response to a second user input, collapsing the formula bar to display only a single line of data; and
automatically adjusting the location of the top of the spreadsheet based on the formula bar displaying only the single line of data.

13. The method of claim 11, wherein expanding further comprises receiving a user interface input to expand the formula bar.

14. The method of claim 11, wherein the text box contains a third portion of data and expanding the formula bar further comprises providing a user interface device to scroll to the third portion of data in the text box.

15. The method of claim 11, wherein the text box contains a third portion of data and expanding the formula bar further comprises providing a visual indication that the text box contains the third portion of data.

16. The method of claim 11, furthering comprising displaying a list box in the formula bar, wherein a user selects, from the list box, a cell identifier for a cell to display in the text box the cell data contained within the selected cell.

17. The method of claim 11, wherein expanding comprises:
receiving user input into the text box; and
automatically expanding the formula bar when the user input contains more data than can be displayed in the text box.

18. A computer readable storage medium containing computer executable instructions that when executed by a computing device, perform a method for displaying data within a spreadsheet of a spreadsheet application, the method comprising:
displaying, on a display device, a formula bar, wherein the formula bar contains a text box for receiving and displaying spreadsheet data;
when the text box contains more spreadsheet data than can be displayed in the text box, expanding the formula bar to increase a display space of the text box, wherein expanding the formula bar comprises:
determining a location of the top of the spreadsheet in relation to the expanded formula bar; and
automatically adjusting the location of the top of the spreadsheet based on the determined location; and
displaying, on the display device, the expanded formula bar and the spreadsheet.

19. The computer readable storage medium of claim 18, wherein the formula bar is expanded based on user input.

20. The computer readable storage medium of claim 18, further comprising instructions to provide a visual indication when the text box contains more data than can be displayed in the text box.

* * * * *